United States Patent
Gits et al.

(10) Patent No.: US 9,277,374 B2
(45) Date of Patent: Mar. 1, 2016

(54) DELIVERING WIRELESS INFORMATION ASSOCIATING TO A FACILITY

(75) Inventors: Peter Michael Gits, Union Pier, MI (US); Dale Seavey, Sunol, CA (US)

(73) Assignee: Cisco Technology, Inc., San Jose, CA (US)

( * ) Notice: Subject to any disclaimer, the term of this patent is extended or adjusted under 35 U.S.C. 154(b) by 612 days.

(21) Appl. No.: 13/165,000

(22) Filed: Jun. 21, 2011

(65) Prior Publication Data

US 2012/0329486 A1  Dec. 27, 2012

(51) Int. Cl.
*H04W 24/00* (2009.01)
*H04W 4/12* (2009.01)
*H04M 1/725* (2006.01)
*H04L 12/58* (2006.01)
*H04W 4/02* (2009.01)
*H04W 4/18* (2009.01)
*H04L 29/08* (2006.01)

(52) U.S. Cl.
CPC ........... *H04W 4/12* (2013.01); *H04L 51/20* (2013.01); *H04M 1/72572* (2013.01); *H04L 51/32* (2013.01); *H04L 67/22* (2013.01); *H04W 4/02* (2013.01); *H04W 4/185* (2013.01)

(58) Field of Classification Search
CPC .................................................. H04W 64/00
See application file for complete search history.

(56) References Cited

U.S. PATENT DOCUMENTS

| 2008/0122871 | A1* | 5/2008 | Guday | 345/634 |
| 2010/0214111 | A1* | 8/2010 | Schuler et al. | 340/686.1 |
| 2010/0304766 | A1* | 12/2010 | Goyal | 455/466 |
| 2011/0060808 | A1* | 3/2011 | Martin et al. | 709/217 |
| 2011/0141254 | A1* | 6/2011 | Roebke et al. | 348/61 |
| 2012/0007713 | A1* | 1/2012 | Nasiri et al. | 340/5.81 |

* cited by examiner

*Primary Examiner* — Justin Lee
(74) *Attorney, Agent, or Firm* — Parker Ibrahim & Berg LLC; James M. Behmke; Stephen D. LeBarron

(57) ABSTRACT

Systems, methods, and apparatus may perform operations related to delivering wireless information associating to a facility. A message is received from a first mobile device with at least a portion of the message including information associated with a physical location. Based on the message, a facility based on the physical location is identified. The message may be associated with the facility. An indication is received that a second mobile device is proximate to the facility and engaged in a message browsing mode. Based on receiving the indication, the message may be presented to the second mobile device.

20 Claims, 5 Drawing Sheets

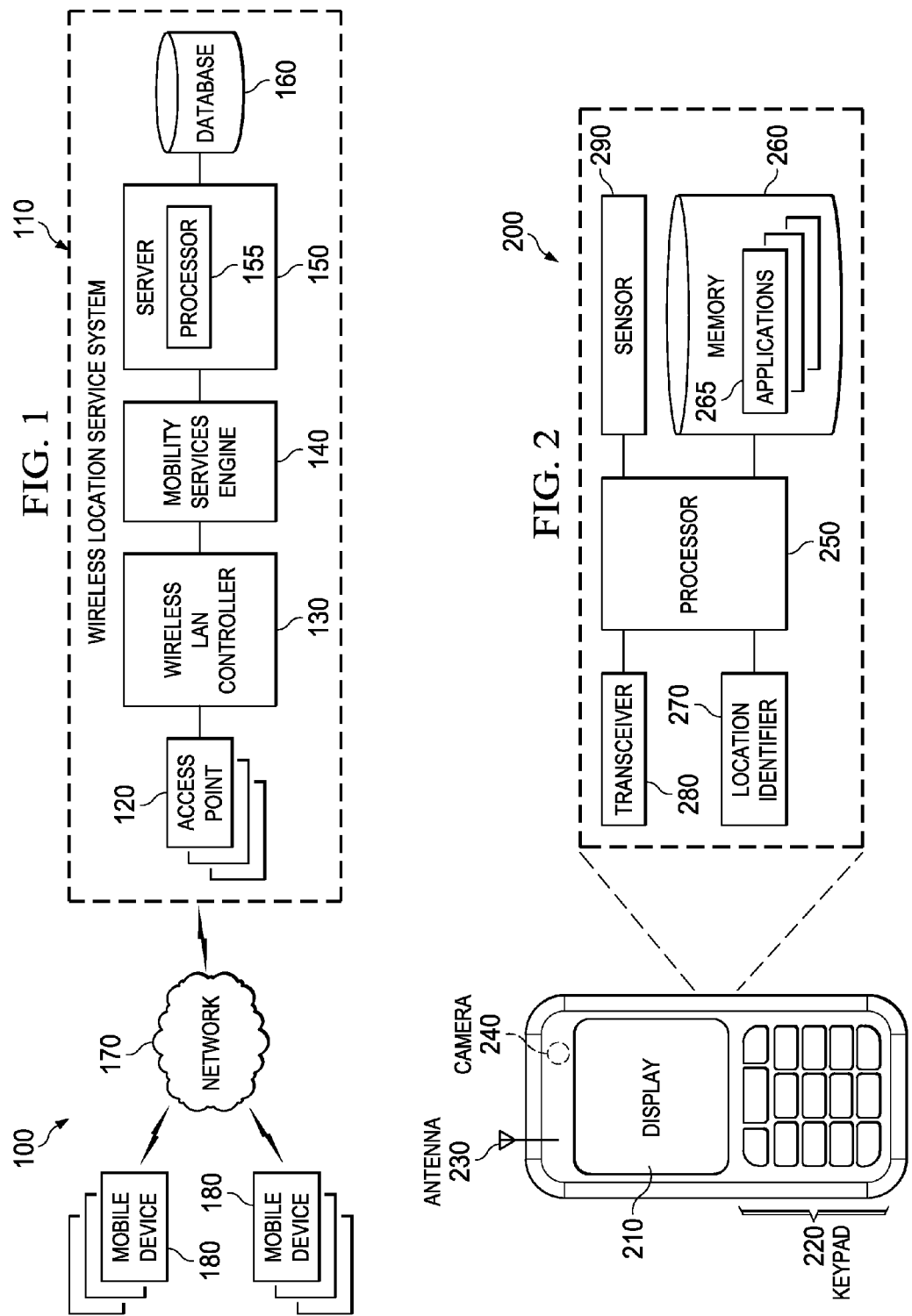

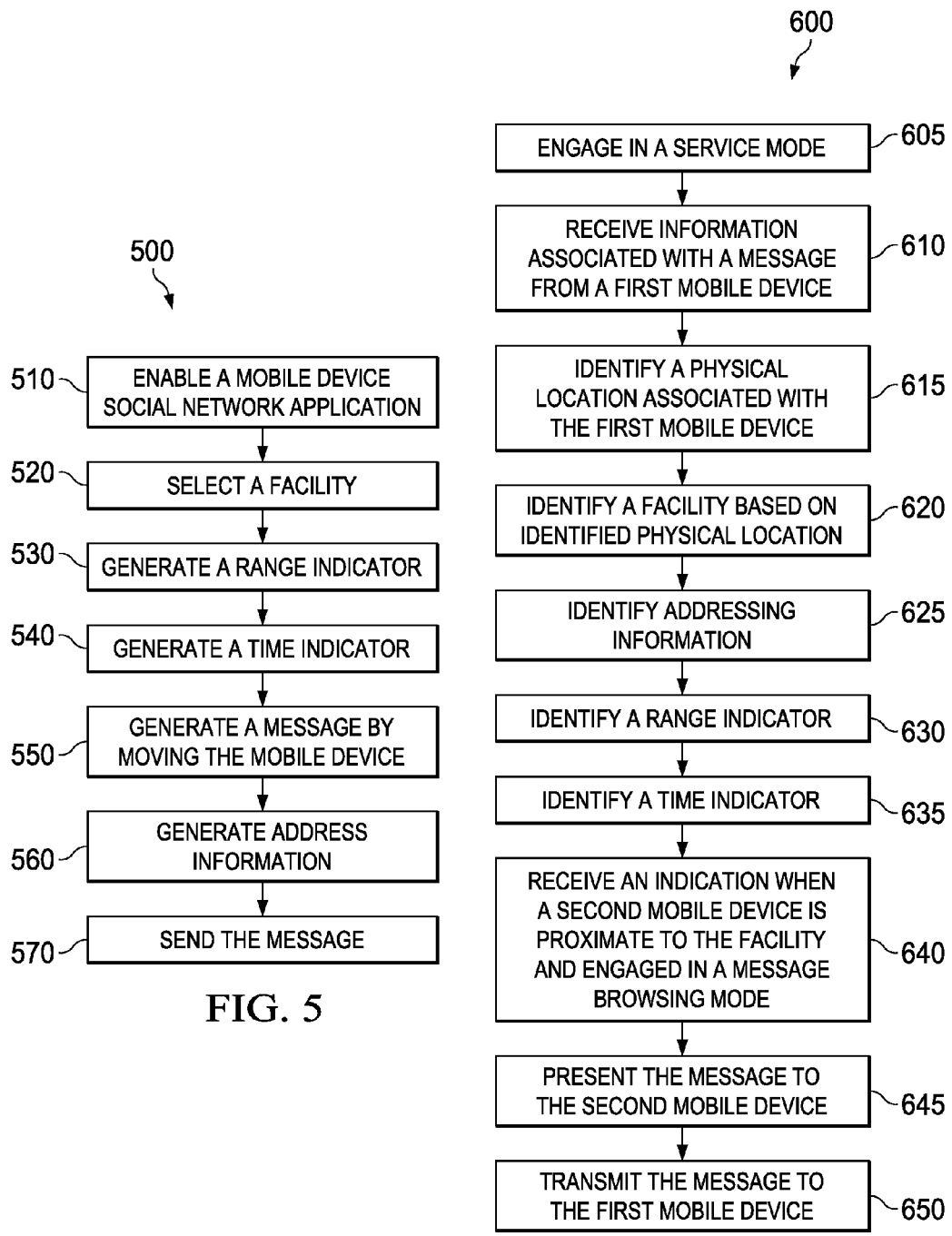

DELIVERING WIRELESS INFORMATION ASSOCIATING TO A FACILITY

TECHNICAL FIELD

The following disclosure relates to delivering wireless information.

BACKGROUND

The evolvement of mobile technologies has enabled wireless systems to provide a variety of services to mobile users. For example, wireless technologies such as wireless local area network (WLAN) technology and global system for mobile communications (GSM) technology may be used for sending information from one mobile electronic device to another mobile electronic device. The technology evolvement also allows mobile electronic devices, such as cell phones and personal digital assistants, to encompass a variety of features. For example, mobile electronic devices may be used for navigation or to capture live images.

DESCRIPTION OF FIGURES

FIG. 1 is a schematic representation of an example environment for providing a location-based wireless message delivering service.

FIG. 2 is a schematic illustrating the architecture of an example mobile device.

FIG. 5 is a flowchart of a process by which a user may generate a wireless message associated with a facility from a mobile device.

FIG. 6 is a flowchart of a process by which a system delivers a wireless message based on a wireless location service.

DESCRIPTION OF EXAMPLE EMBODIMENTS

Overview

Figure 3:
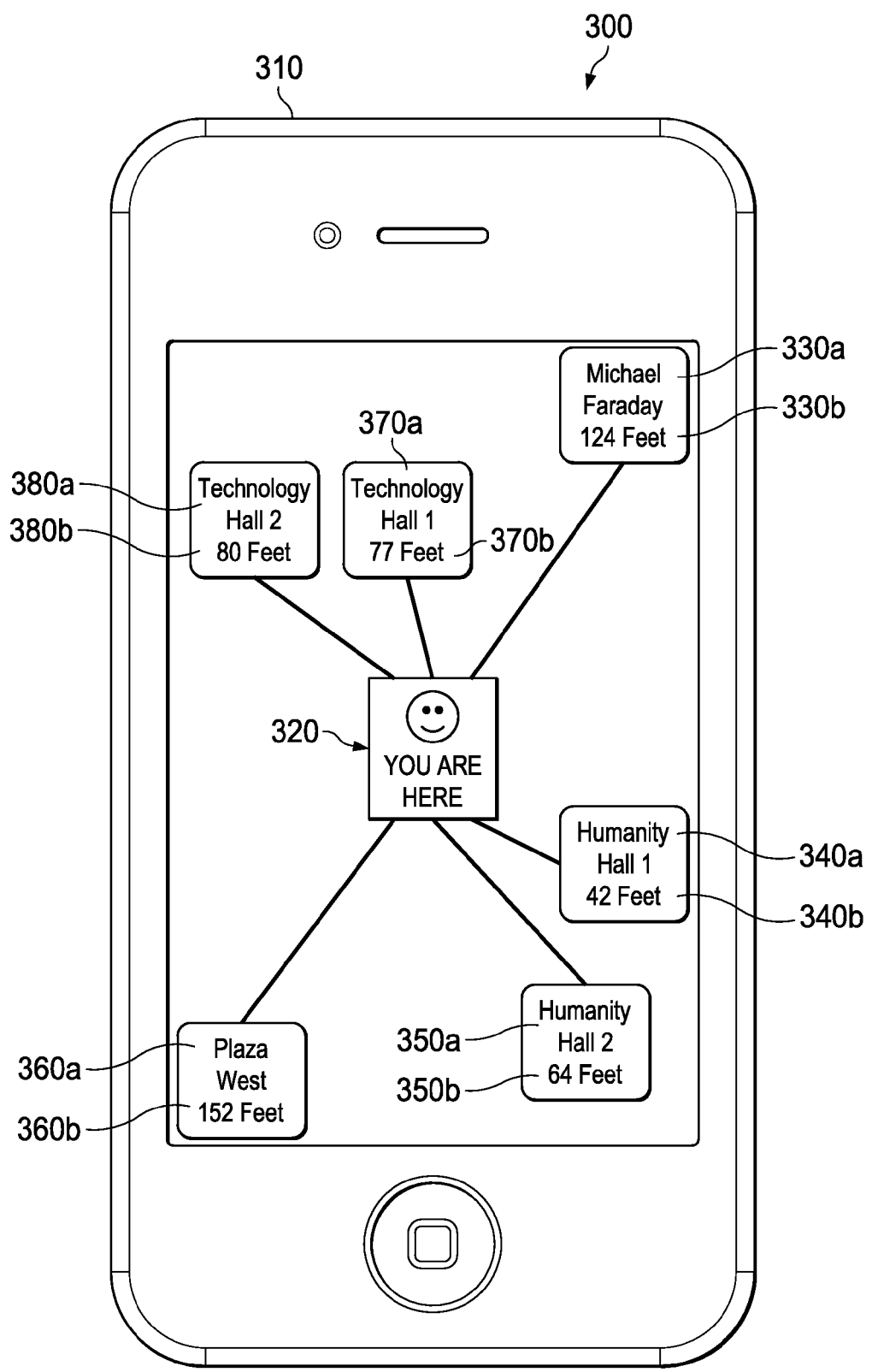
FIG. 3 is a schematic illustrating an example mobile device user interface for identifying a facility for message delivery.

In some implementations, delivering a message may generally include one or more of the following features. A message is received from a first mobile device, the message being associated with a particular location. Based on the received message, a facility based on the physical location is identified. The received message is associated with the facility. An indication is received that a second mobile device is proximate to the facility and engaged in a message browsing mode. The message is presented to the second mobile device based on the received indication that the second mobile device is proximate to the facility and engaged in message browsing mode.

DETAILED DESCRIPTION

Wireless technologies may be implemented on electronic products, networks and systems to provide a variety of services to mobile users. In some implementations, wireless technologies may be used for providing location identification services associated with facilities and/or mobile users through a wireless system. In some instances, the location identification services may be further combined with other wireless service capabilities including identifying distance, time and user identity associated with a message for wireless information delivery. For example, a wireless system may be able to track a location of a mobile user and receive a wireless signal sent from the mobile user. The received signal may include information associated with a message that the mobile user wants to deliver, identity information of the facility and the identity information of the intended recipient. In some instances, the wireless system may identify from the received signal one or more facilities in proximity of the mobile user based on at least a portion of the received signal, and present one or more identifications associated with the one or more facilities for the mobile user's selection. In some implementations, the wireless system may identify from the received signal, information descriptive of the movement of the mobile electronic device used by the mobile user. In other implementations, the wireless system may identify from the received signal a range and or a time frame within which the message may be viewed. The wireless system also may identify addressing information that helps in coordinating the message to one or more authorized viewers. The wireless system may also be configured to perform one or more of the following functions: the wireless system may monitor mobile user(s) that is located in proximate to the facility, and receive an indication from the mobile user(s) when the mobile user(s) is engaged in a message browsing mode. The message may be presented to the mobile user(s) based on range information, time information and/or address information included in the received signal. In some instances, the message may be presented to the mobile user as a virtual graffiti which has a size and a shape that mimic the movement of the mobile electronic device. A return receipt may also be sent to confirm the presentation of the message. In some instances, a plurality of messages may be presented to the mobile user(s) as overlays with different colors.

FIG. 1 is a schematic representation of an example environment 100 for providing a location-based wireless message delivering service. The example environment 100 in FIG. 1 includes three high-level components, a wireless location service system 110, a network 170 and one or more mobile devices 180.

In the example implementation illustrated in FIG. 1, the wireless location service system 110 includes one or more wireless access points 120, a wireless local area network (WLAN) controller 130, a mobile services engine (MSE) 140, a server 150 and a database 160. In some implementations, a wireless location service system 110 may include additional and/or different features, components and/or subsystems. At a high level, the wireless location service system 110 may provide services including locating mobile/fixed electronic devices, objects, and/or facilities, transmitting, receiving and/or processing signals associated with physical locations, electronic devices, objects and/or facilities.

An access point 120 is an electronic device that may allow mobile devices 180 to connect to a wired network using Wi-Fi, Bluetooth, WiMAX or related standards. In some implementations, wireless access point 120 may be connected to a router (via a wired network), and may relay data between the mobile devices 180 and wired devices on the network 170. In general, wireless access point 120 may act as a bridge, router, and/or a client in a wireless location service system 110. Wireless access points 120 may also be in communication with one or more WLAN controllers 130. WLAN controller 130 may be used to manage one or more access points 120. The wireless LAN controller 130 may be part of a data plane within a wireless system model (e.g., Cisco wireless model). The WLAN controller 130 may be used to automatically handle the configuration of wireless access-points 120, depending on the wireless system model. In some implementations, WLAN controller 130 may further be configured for communication with a mobility services engine (MSE) 140 (e.g., Cisco MSE). The MSE may be an appliance-based unit that supports wireless services to provide centralized and scalable service delivery including location services.

The illustrated example wireless location service system 110 includes a server 150. At a high level, the server 150 comprises electronic computing device(s) operable to receive, transmit, process, store, or manage data and signal associated with the example environment 100. Specifically, the server 150 illustrated in FIG. 1 may be responsible for processing signals bearing one or more kinds of information received from a mobile device 180 including information descriptive of movement of the mobile device, distance information, time information, range information and address information. The server 150 may also be responsible for processing information received from access point 120, WLAN controller 130 and MSE 140 including information associating with identifying location information of mobile devices 180, monitoring information associated with the operation mode of the mobile devices 180. The server may also store one or more applications and process the one or more applications for providing services to mobile devices 180 operating in the environment 100 through network(s) 170. The server may be communicably coupled to the WLAN controller 130, MSE 140 and a database 160. In general, the server 150 is any server that stores one or more hosted applications, where at least a portion of the hosted applications are executed via requests and responses sent to mobile devices 180 or clients within and communicably coupled to the illustrated environment 100 of FIG. 1. In some instances, the server 150 may store a plurality of various hosted applications, while in other instances, the server 150 may be a dedicated server meant to store and execute only a single hosted application. In some instances, the server 150 may comprise a web server, where the hosted applications represent one or more web-based applications accessed and executed via network 120 by the mobile devices 180 of the environment 100 to perform the programmed tasks or operations of the hosted application. Although FIG. 1 illustrates a single server 150, the example environment 100 may be implemented using two or more servers 150, as well as computers other than servers, including a server pool. Indeed, server 150 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 150 may be adapted to execute any operating system, including Linux, UNIX, Windows, Mac OS, or any other suitable operating system.

The server 150 may include a processor 155. Although illustrated as a single processor 155 in FIG. 1, two or more processors may be used according to particular needs, desires, or particular implementations of the server. Generally, a processor 155 receives instructions and data from a read only memory or a random access memory or both. The server 150 may include a processor 155 for performing instructions and one or more memory devices for storing instructions and data. In some instances, the instructions and data may be stored in a database 160 external to the server 150. Generally, a server 150 may include, or be operatively coupled to receive data from or transfer data to, or both, one or more non-transitory mass storage devices for storing data, e.g., magnetic, magneto optical disks, or optical disks. Each processor 155 may include a central processing unit (CPU), a blade, an application specific integrated circuit (ASIC), a field-programmable gate array (FPGA), or another suitable component. The functions of the processor 155 may also include computation, queue management, control processing, graphic acceleration, video decoding, and execution of a sequence of stored instructions from the program kept in the memory or database 160. In some implementations, the processor 155 also may be responsible for signal processing including sampling, quantizing, encoding/decoding, and/or modulation/demodulation of a signal.

The server 150 may also be communicably coupled to a database 160. In general, the database 160 may be a system used to organize, store, and/or retrieve data. Database 160 may include an organized collection of data for one or more uses, typically in digital form. Data stored in the database 160 may be managed by the server 150. In some instances, server 150 may store database contents, allowing data creation and maintenance, and search and other access. In some implementations, database 160 may store location information. For example, the data stored in the database 160 may contain information associated with location of rooms, equipment, etc., the information in some instances, may be identified by a mobile device 180 located in the room or on the equipment, or may be identified by other means and stored in the database 160. For example, a Wi-Fi enabled electronic device (e.g., an access point 120) may be located in the room to provide location information. In an enterprise environment, specified locations (e.g., conference rooms) may be mapped out within an office building or complex. Each conference room may be measured based on a reading between an access point and the edges of the conference room and mapped out and tagged with coordinates. This may eliminate the need for a mobile device 180 to identify a fixed location. The stored measurements may also be updated or corrected.

In some implementations, the information stored in the database may include floor plans of a building, a venue or any other kinds of constructions. The wireless location service system 110 may use radio frequency (RF) fingerprinting to locate facilities and/or users based on the stored floor plans. The server 150 may perform an RF prediction that may be used to create a grid mapped to a floor plan that includes physical characteristics and access points 120 in a given area. For finer accuracy, actual measurements and a calibration may be taken by the wireless location service system 110. With RF fingerprinting, real-time data regarding physical objects locations in a given area is gathered by access points 120. The RF fingerprinting may be gathered based on a location identifier (e.g., an RFID) included in each of the mobile devices 180, objects and/or the facilities in the given area. The RF real-time data may be compared to the grid to determine the mobile device's 180 location relative to the facilities in proximity. With RF fingerprinting, the server 150 uses the information that it receives from the access points 120 and matches it against the database 160 of location fingerprints. The database that includes RF fingerprinting may take into account the floor plan of the architecture as well as path-loss attenuation, shadowing effect, multi-path fading effect and/or mobility of the mobile device 180. The wireless location service system 110 may also use triangulation to identify the location of the mobile device 180. Triangulation may use multiple access points 120 to locate the mobile device 180 based on the received signal strength of the device at each access point 120. Using algorithms, the server 150 may determine the intersection point of the mobile device's 180 signal at each access point 120 to identify the device's most likely location. The server 150 may also use a closest access point method to find mobile devices 180 within the total coverage area of a single access point 120. Alternatively or in addition, the server may receive location information from a Global Position System chipset on a mobile device 180 and/or from an inertial navigation system resident on board the mobile device 180.

The location of the mobile device 180 or other mobile devices may be identified at regular predefined intervals or at the occurrence of an event (e.g., application activated, movement of the wireless device). In some instances, the location data may be sent to the database 160 communicably coupled to the server 150, along with a time stamp corresponding to when the wireless device was at the location. The location of rooms, equipment, or other facilities may be identified by a mobile device 180 located in the room, on the equipment, in the facilities, or may be identified by other means and stored in the database 160. For example, a Wi-Fi enabled device may be located in the room to provide location information. In an enterprise environment, specified locations (e.g., conference rooms) may be mapped out within an office building or complex. Each conference room may be measured based on a reading between an access point 120 and the edges of the conference room and mapped out and tagged with coordinates. This would reduce the workload for a mobile device 180 to identify a fixed facility. The stored measurements may also be updated or corrected by the server 160.

In the illustrated example environment 100, the communications between the mobile devices 180 and the wireless location service system 110 are through a network 170. Generally, the network 170 facilitates wireless communications between the mobile devices 180 operated in the environment 100, as well as with any other local or remote electronic devices 180 communicably coupled to the network 170 but not illustrated in FIG. 1. The network 170 is illustrated as a single network in FIG. 1, but may be a continuous or discontinuous network without departing from the scope of this disclosure, so long as at least a portion of the network may facilitate communications between senders and recipients. The network 170 may be all or a portion of an enterprise or secured network, while in another instance at least a portion of the network 170 may represent a connection to the Internet. In some instances, a portion of the network 170 may be a virtual private network (VPN), such as, for example, the connection between the mobile device 180 and the server 130. Further, all or a portion of the network 170 may comprise wireless links. Example wireless links may include 802.11a/b/g/n, 802.20, WiMAX, Bluetooth and/or any other appropriate wireless link. In other words, the network 170 encompasses any internal or external network, networks, subnetwork, or combination thereof operable to facilitate communications between various computing components inside and outside the illustrated environment. The network 170 may communicate, for example, Internet Protocol (IP) packets, Frame Relay frames, Asynchronous Transfer Mode (ATM) cells, voice, video, data, and other suitable information between network addresses. The network 170 may also include one or more local area networks (LANs), radio access networks (RANs), metropolitan area networks (MANs), wide area networks (WANs), all or a portion of the Internet, and/or any other communication system or systems at one or more locations.

The wireless location service system 110 may be used to provide service(s) to one or more mobile devices 180. A mobile device 180 may be any computing device operable to connect to or communicate with the wireless location service system 110 and the network 170 using wireless connections. In general, a mobile device 180 may include an electronic computing device operable to receive, transmit, process, and store any appropriate data associated with the environment 100 of FIG. 1. It will be understood that there may be any number of mobile devices 180 associated with, or external to, the example environment 100. For example, while illustrated environment 100 includes two mobile devices 180, alternative implementations of wireless environment 100 may include a plurality of mobile devices communicably coupled to the network 170 and wireless location service system 110 to the purposes of the environment 100. Additionally, there may also be one or more additional mobile devices 180 external to the illustrated portion of environment 100 that are capable of interacting with the wireless location service system 110 via the network 170. Further, the term "mobile device" and "mobile user" may be used interchangeably as appropriate without departing from the scope of this disclosure. Moreover, while each mobile device 180 is described in terms of being used by a single user, this disclosure contemplates that many users may use one user device, or that one user may use multiple user devices. In some implementations, the mobile device 180 may be a mobile device used by an end-user to communicate information using radio technology and performing a plurality of computing tasks. Mobile device 180 may also be referred to as mobile electronic device, user device, mobile station, subscriber station, or wireless terminal. A mobile device 180 may include a wireless phone, a Personal Data Assistant (PDA), a smartphone, a laptop, a tablet computer, a Session Initiation Protocol (SIP) phone, a touch screen terminal, or other wireless communication devices capable of performing a plurality of tasks including communicating information using a wireless technology.

FIG. 2 is a schematic illustrating the architecture of an example mobile device. In the illustrated example, the hardware components of the mobile device include a display 210, a keypad 220, one or more antennas 230, one or more cameras 240, a processor 250, a memory, a location identifier 270, a transceiver 280 and a sensor 290. The display is an output device for presentation of information in visual or tactile form in response to electronic input signals. In some implementations, the display may include a touchscreen, which is an electronic visual display that may detect the presence and location of a touch within the display area. The term, touchscreen, may generally refer to touching the display of the device with a finger or hand. Touchscreens also may sense other passive objects, such as a stylus. The display 210 may be used to display location-related information, a real-time view of the environment, a mobile user identity and other appropriate information without departing from the scope of the disclosure. The keypad 220 is an input unit of the mobile device. A keypad may include multiple keys (not shown) arranged in a block, which includes numerical keys, alphabetic keys, standard telephone keys, or any other icons or symbols. In some implementations, the keypad 220 also may be shown on a touchscreen, which may be integrated with the display 210. The keypad 220 may be used to type in a specific element (e.g., room, equipment, person, facility) to locate, type a message for display or type in information relating to the message viewing restrictions. The mobile device also may include at least one antenna 230. The antenna 230 may be internal or external to the mobile device. The antenna 230 may include a transducer which may transmit and/or receive electromagnetic waves. Antenna 230 may be configured to convert electromagnetic radiation into electric current, or vice versa. Antenna 230 is generally responsible for the transmission and reception of radio waves, and may serve as the interface between the transceiver 280 and the wireless channel. In some implementations, multiple antennas 230 may be included in the mobile device to enable multiple-input-multiple-output (MIMO) technology for increasing transmission rate and/or reliability. One or more cameras 240 also may be included in the mobile device. Cameras 240 may be used to record images. The images recorded by camera 240 may include a still image or moving images such as movies or videos. The one or more cameras 240 may also be used to capture real-time images that may be displayed on the display instantaneously. Each of the one or more cameras 240 may also include an optical sensor (not shown). The optical sensor may be a charge-coupled device, complementary metal-oxide semiconductor (CMOS), or any other suitable device. The optical sensor receives light projected through one or more lenses and converts the light to data representing an image. The mobile device may include any number of other user interfaces (not shown) such as one or more manual buttons (e.g., switches). The mobile user may select and activate the applications by touching the touchscreen or pressing one or more buttons. The mobile device may also include one or more speakers and one or more microphones (not shown).

As illustrated in FIG. 2, a mobile device includes a processor 250. Although illustrated as a single processor 250 in FIG. 2, two or more processors may be used according to particular needs, desires, or particular implementations of mobile device architecture 200. Generally, the processor 250 executes instructions and manipulates data to perform the operations of the mobile device and, specifically, the one or more plurality of applications 265 stored in memory 260. The processor 250 also may include feature sets similar to the functionalities of the processor 155 included in the server 150 as illustrated in FIG. 1.

Memory 260 may include any memory or database module and may take the form of volatile or non-volatile memory including, without limitation, magnetic media, optical media, random access memory (RAM), read-only memory (ROM), removable media, or any other suitable local or remote memory component. Memory 260 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the mobile device and its one or more applications 265. At a high level, each of the one or more applications 265 is any application, program, module, process, or other software that may execute, change, delete, generate, or otherwise manage information according to the present disclosure, particularly in response to and in connection with one or more location-based message delivering service. In some implementations, a particular mobile device may be configured to support a specialized function (e.g., a retail price reader at a retail establishment). In another implementation, multiple applications 265 may be stored at a single mobile device. Additionally, the applications 265 may include a child or sub-module of another software module or application without departing from the scope of this disclosure.

The wireless transceivers 280 may include both the transmitter circuitry and the receiver circuitry. The wireless transceivers 280 may be responsible for up-converting a baseband signal to a passband signal or vice versa. The components of wireless transceivers 280 may include a digital to analog converter/analog to digital converter, amplifier, frequency filter and oscillator. The wireless signals transmitted or received by the antenna 280 may be directly before/after processed by the transceivers 280.

The location identifier 270 may be used for assisting the wireless location service system to determine the position and/or identity of the mobile device. In some instances, the location identifier 270 may include proximity sensor, optical sensor, magnetometer, compass, RFID, wireless sensor, or any other device configured to determine the position and/or identity of the mobile device. The location identifier 270 may be used in combination with one or more components of the wireless location service system to identify the location of the mobile device or may store information received from the wireless location service system indicating the location of the mobile device.

The illustrated mobile device architecture also includes a sensor 290. The sensor 290 may be used for the detection of different manual manipulation, including, for example, orientation, motion, tilt, etc. The sensor 290 may include, for example, a motion detector, accelerometer, gravity meter, gyroscope, etc. In some instances, the sensor 290 determines the orientation of the device (e.g., horizontal, vertical) based on analysis of data received from one or more accelerometers. The accelerometer may detect movement of the mobile device along any axis (e.g., horizontal, vertical) or any combination of planes (e.g., three dimensional movement).

It is to be understood that the mobile device shown in FIG. 2 and described herein is an example of a mobile device, and that the device may have additional, fewer or different components or a different arrangement or configuration of components, without departing from the scope of the disclosure. The mobile device may be configured to operate in different modes based on the position and/or user of the mobile device. In some implementations, when the mobile device is held in a generally flat, horizontal position, directions to facilities are displayed with distance information (FIG. 3). If the mobile device is tilted upwards (towards a generally vertical position), the environment are displayed in the real time view with overlays displaying virtual graffiti (FIG. 5) and rendered as a augmented reality browser. If the mobile device is tilted further up, additional messages and/or facilities appear identifying elements that are farther away. In some implementations, mobile user may switch between modes to display facilities information and virtual graffiti.

FIG. 3 is a schematic illustrating an example mobile device user interface 300 for identifying a facility for message delivery. The illustrated user interface 300 is a graphic interface which may be presented on the display 310 of a mobile device. The mobile device may include a mobile device operating in the illustrated example environment 100 shown in FIG. 1. The user interface 300 may be generated based on receiving information from the wireless location service system in response to a service request sent by the mobile user. By viewing the facilities in proximity and their respective distance, the mobile user may choose, based on the information presented on the user interface 300 which one or more facilities to associate the message to. In the particular implementation as illustrated in FIG. 3, an icon 320 is displayed in the center of the display 310 which represents the current position of the mobile device relative to the nearby facilities and mobile users. One or more facilities and/or user, their respective directions and distance relative to the mobile device are presented on the display 310. The facilities and mobile users displayed on the display 310 includes a mobile user named Michael Faraday 330*a*, 124 feet 330*b* away to the northeast of the mobile device, Humanity Hall 1 340*a*, 42 feet 340*b* away to the southeast, Humanity Hall 2 350*a*, 64 feet 350b away to the south, Plaza West 360a, 152 feet 360b away to the southwest, Technology Hall 1 370a, 77 feet away to the north and Technology Hall 2, 80 feet 380b away to the northwest. In some instances, the distance from which the facilities and mobile users may be displayed on the mobile device user interface 300 may be determined by the wireless location service system. In some instances, the facilities and mobile users that may be displayed may be based on the tilting angle of the mobile device as described before. Further, the facilities and mobile users that may be displayed may be equipped with a location identifier such as the location identifier 270 illustrated in FIG. 2. The facilities and mobile users may also have registered to the wireless location service system. The mobile user who wants to deliver message(s) may choose from the facilities and/or mobile users displayed on the display 310 to associate the message(s) with the location of the facilities and/or mobile user after delivery. The facility or mobile user may be chosen by using a keypad, voice command using a microphone or by pressing a touchscreen. In some implementations, the current position of the mobile device, other mobile users and facilities may be displayed on other user interfaces as long as they are illustrative of the identity, relative distance or direction from the mobile user.

Figure 4:
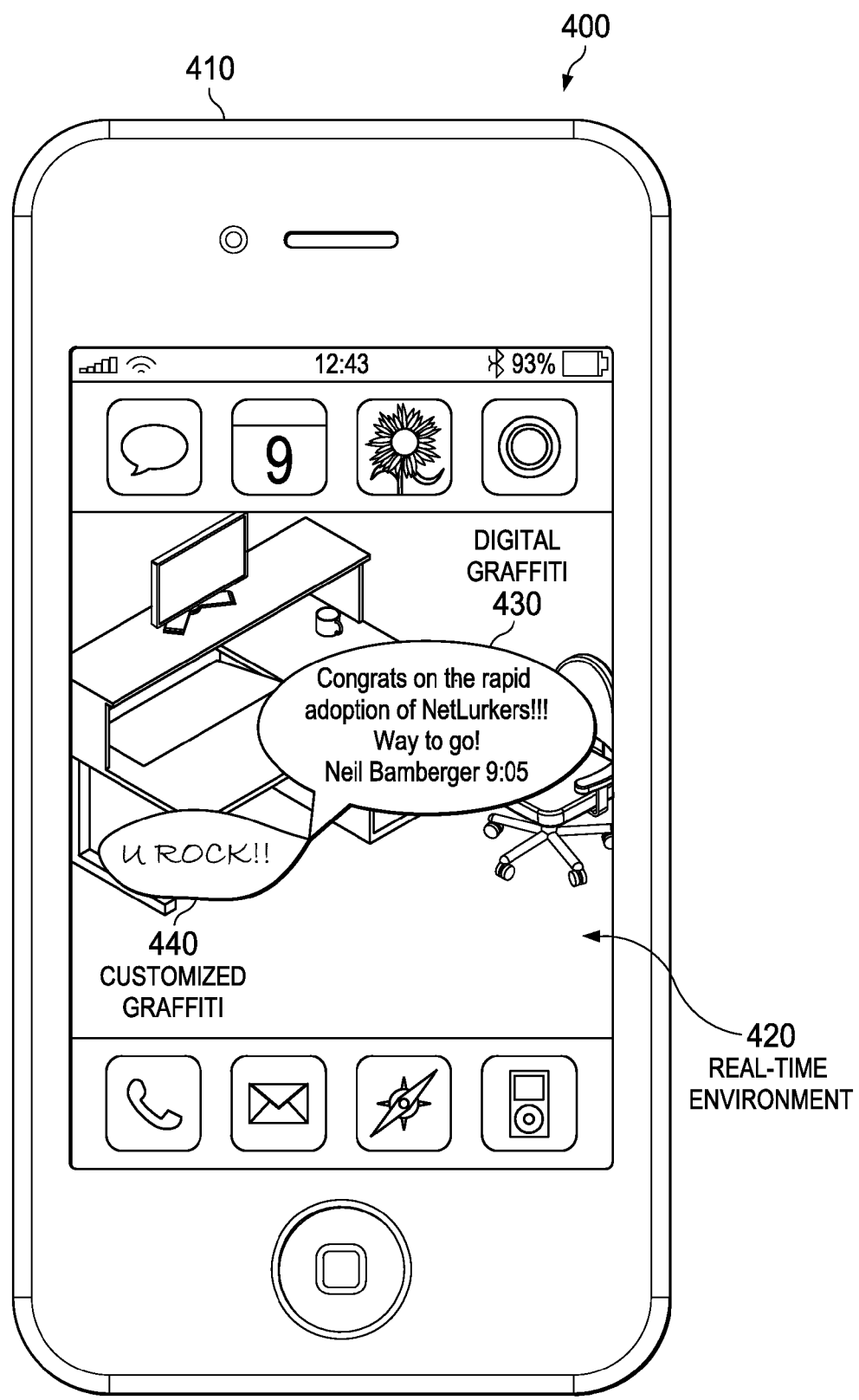
FIG. 4 is a schematic illustrating an example mobile device user interface for presenting message(s) associated with a facility.

FIG. 4 is a schematic illustrating an example mobile device user interface 400 for presenting message(s) associated with a facility. The mobile device displaying the user interface 400 on the display 410 may be engaged in a message browsing mode. In the illustrated example, the background of the user interface 400 is a real-time environment view 420 captured by a camera included in the mobile device. The example user interface 400 shown in FIG. 4 may include a user interface of an augmented reality application. The augmented reality application may be used to display messages based on augmented reality. Augmented reality may be a live direct or an indirect view of a physical, real-world environment, in which one or more elements may be augmented by electronically generated input, such as graphics or messages. In some instances, the view of reality may be modified by the augmented reality application. As a result, the augmented reality application may function by enhancing the mobile user's current perception of reality, such as presenting messages or graffiti as overlays of the real-time environment. Graffiti may be a maker that represents the motion of the mobile device. In some implementations, a motion sensor (e.g., a gyroscope) may be included in a mobile device to track/record particular motions based on the movement of the mobile device. A user may generate a graffiti by wanding a message using the mobile device that includes a motion sensor, as if the motion of the wireless device represented a marker. In the particular implementation shown in FIG. 4, the electronically generated input presented on the display are a digital graffiti 430 and a customized graffiti 440. The digital graffiti 430 may be in a form where the characters are generated using fonts integrated in the mobile device. The customized graffiti 440 may be in a form that mimics the movement of a mobile device that generated the message. Multiple messages may be presented on the display using different colors and forms. For example, a message may be in the form of a customized graffiti composed by a virtual spray can, presented on a wall of the Technology Hall 1 370a or presented in the form of a yellow sticky note on the door of Humanity Hall 2 350a described in FIG. 3. The order of the overlays may be based on the order that the messages are created or specified by the mobile user who sends or receives the message.

FIG. 5 is a flowchart of a process 500 by which a user may generate a wireless message associated with a facility from a mobile device. The process starts at 510, where a system enables a social network application on a mobile device. The term "system" used hereinafter may be referred to a system that includes at least one of a mobile device, a server, and/or other network components working in conjunction with one another. The social network application may include application which is capable of performing operations that are communicable with other mobile devices, objects and/or facilities. For example, the application may be represented as a spray can icon displayed on the mobile device. By opening the application, the mobile user may be able to view a user interface such as the user interface illustrated in FIG. 3. The mobile user may then choose at least one facility and/or mobile user to communicate with. In some instances, the user interfaces with a social network application, such as Facebook, Twitter, LinkedIn, etc., in order to deliver message(s) to one or more facilities. Location-based message delivering add-ons may be added to the existing social network applications in order to deliver message associating to a facility.

At 520, the system selects a facility. In some instances, more than one facility may be selected. The facility selected may include an identification of the facility that the message is addressed. As described in the illustration of FIG. 3, the facility may be selected from a plurality of facilities showing on a user interface 300. In some instances, the facility may also be selected from a list of facilities provided by the wireless location service system. Each of the facilities registered to the wireless location service system may also be associated with an identifier. The facility may also be selected by choosing or type in the identifier on the mobile device. In some instances, the mobile user is proximate to the facility that the message is associated with, and a particular motion of wanding for selecting a facility may not cause the mobile device to point to other surrounding facilities. In such case, the facility may be selected by wanding the mobile device towards the facility without choosing the facility from a plurality of facilities. In some instances, the mobile user may select the facility by pointing the mobile device to the direction to the intended facility and specify an approximate distance (e.g., choosing a "spray distance" or type in a distance value) from the mobile device to the intended facility. In other implementations, the facility may be selected via Facebook, Twitter and/or other social network applications add-on that provides text and/or graphic representations of all the available facilities to chosen from.

At 530, the system generates a range indicator. The range indicator may indicate a three-dimensional range proximate to the selected facility that the message may be viewed. For example, a range indicator may be a radius centered around the facility. A range indicator also may indicate an area, a venue, a room or any other space that is associated with the facility. In some instances, a range indicator may include direction information. The direction information may be descriptive of a viewing direction of the message. For example, the direction information can be identified by the wireless location service system. When a mobile device in range is determined to be an addressee of the message, the message may be presented to the mobile device in response to determining that the mobile device is facing toward a direction in accordance with the direction information identified by the wireless location service system. In some implementations, the message is presented to the in range mobile device only if that device is determined to be facing that direction. In certain implementations, the message may be addressed to one or more users via social network application (e.g., facebook) without associating the message to a physical range.

At 540, the system generates a time indicator. The time indicator may indicate a time that the message may be viewed. In some implementations, the time indicator may indicate a time period that the message is available for viewing by the mobile user that generates the message or other mobile users in proximity of the facility engaged in a message browsing mode. In some instances, the time indicator is a value descriptive of a time instant that represents an expiration time of the message (e.g., an expiration stamp). The message may be available for viewing before the expiration time. The wireless location service system may identify the time information carried by the time indicator and present the message to a mobile user based on the identified time information.

At 550, the system generates a message by moving the mobile device. The message may be generated in a variety of forms. In some implementations, the mobile device includes a sensor (e.g., the sensor 290 described in the illustration of FIG. 2). The mobile user may generate a message which has the form of graffiti by manipulating the mobile device just as a spray can. For example, the mobile user may press a button or a touch screen of the mobile device that mimics pressing the button of a spray can. The mobile device may further be moved, tilted and/or yawed by the mobile user. The sensor may track the movement, yaw and angle to create graffiti that mimics spraying graffiti using a spray can. In some instances, the generated graffiti may be presented on the display for the mobile user's review before sending out. In certain instances, the mobile user is close to a facility that the message is intended to, the mobile user may create the graffiti by pointing the mobile device towards the facility without selecting the facility from a plurality of facilities and/or mobile users. The message may also be generated by typing using a keyboard, dictating using a microphone, handwriting on a touch touchscreen. In some instances, the mobile user may further customize the color, line-width and animated expressions associated with the message. In some implementations, the message may be a voice message. The voice message may be generated by a mobile device coupled to the system. The wireless location service system may process the voice message and establish an association between the voice message and one or more facilities based on instructions from the mobile device. In certain implementations, a voice message may be used in combination with a message in text/graffiti format. The voice message may be a guide message to inform an authorized mobile user when and/or where to view the text/graffiti formatted message, and vice versa. For example, when a mobile user enters a building, he/she may be electronically notified that a voice message is ready for review. The voice message may include instructions to guide him to view a virtual sticky note (e.g., a virtual graffiti) associated with a bulletin board inside the building.

At 560, the system generates address information. The address information may be used to identify the identity of a mobile user who may browse the message. In some instances, the address information may be one or more identifiers identifying the one or more addressees of the message. The address information may also be a password protection where only the mobile users who know the password may view the message. The address information may also be an encryption algorithm which may encode the message, and the message may only be decoded and viewed by mobile users who are informed with the code word(s). In general, the address information provides authentication for browsing the message, to the mobile users in proximity to the facility and engaged in a message browsing mode.

At 570, the system sends the message from the mobile device. The message may be sent by releasing the button or touch point on the touchscreen that mimics the finish of drawing graffiti using a spray can. The message may also be sent by clicking a graphical element associated with sending a message included in the social network application.

FIG. 6 is a flowchart of a process 600 by which a system delivers a wireless message based on a wireless location service. At a high level, the example 600 includes three high-level processes at the server 150 included in the wireless location service system 110 as illustrated in FIG. 1: (1) receive and identify information associated with a message from a first mobile device; (2) receive and identify indication from a second mobile device; and (3) present the message on the second mobile device based on the identified information. At 605, the server is engaged in a service mode.

At 610, the system receives information associated with a message from a first mobile device. The information may be carried by wireless signals detected by the wireless access point (such as the access point 120 illustrated in FIG. 1) and processed by the server 150. In some instances, the wireless signal may be encoded, modulated and up-converted to a frequency band suitable for the wireless communication environment. In such instances, receiving the information includes down-converting, demodulating and decoding the information bearing signal.

At 615, the system identifies a physical location associated with the first mobile device. The physical location of the first mobile device may be identified based on a location identifier (such as the location identifier 270 illustrated in FIG. 2) stored in the first mobile device, and the use of the wireless location service system (illustrated in FIG. 1). In some instances, the physical location may be identified using implementations similar to the implementations described in the illustration of FIG. 1.

At 620, the system identifies a facility based on the identified physical location. The identified facility may be the facility the message is associated with after delivery. The facility may be positioned relative to the physical location of the first mobile device. For example, the wireless location service system may first identify all the facilities that are within a certain range of the physical location of the first mobile device, and then identify the facility from all the facilities in range based on receiving the message. The wireless location service system may also identify the facility based on distance and direction relative the physical location of the first mobile device. In some implementations, identifying the facility may also include identify the facility based on the received message and locating the facility by using one or more features of the wireless location service system (e.g., using RF fingerprinting as described in the illustration of FIG. 1).

At 625, the system identifies the addressing information. The addressing information may include addressing information described with respect to FIG. 5. The wireless location service system may provide service to the identified addressees.

At 630, the system identifies a range indicator that describes a three dimensional range. The wireless location service system may provide service to the mobile devices that are identified to be located within the identified range proximate to the facility. At 635, the process identifies a time indicator that describes a time. The wireless location service system may provide service to the mobile devices that are engaged in the message browsing mode during the identified time At 640, the system receives an indication when a second mobile device is proximate to the facility and engaged in a message browsing mode. The indication may be generated by the second mobile device located proximate to the facility and engages in a message browsing mode. In some instances, the indication may also be received by the server based on tracking the location of the second mobile device using the wireless location service system. For example, when the second mobile device is identified by the wireless location service system as being located proximate to the facility, a signal may be sent to the second mobile device to notify an incoming message if the second mobile device is the identified addressee. A phone chime may be generated on the second mobile device in response to the signal. Alternatively, a mobile user may engage the second mobile device in a message browsing mode in response to the phone chime, and the indication may be sent to the server.

At 645, the system presents the message to the second mobile device. In some implementations, presenting the message is based on receiving information descriptive of movement of the first mobile device. In some instances, the server may decode the message and present the message to the mobile device as digital graffiti (e.g., the digital graffiti illustrated in FIG. 4). In still other implementations, the server may coordinate the received information descriptive of movement of the first mobile device to the second mobile device. The message may be identified by the second mobile device and displayed as digital graffiti or as customized graffiti based on the presented information. The information received by the server may include one or more features of the message including address information, time indicator and range indictor. Presenting the message to the mobile device may be based on one or more of the features. In some implementations, the user of the first mobile device may view the message generated by itself, as long as the first mobile device is engaged in a message browsing mode, and satisfy one or more conditions of browsing the message. In still other implementations, the message may be presented to mobile device(s) other than the first and the second mobile devices as long as the mobile device(s) satisfies one or more conditions described above for browsing the message. In still other implementations, the server may receive more than one messages from one mobile user, and at least a portion of the more than one messages may be associated with more than one facilities.

At 650, the system transmits the message to the first mobile device to indicate that the message is presented to the second mobile device as a type of acknowledgement receipt. For example, the server may transmit the message to the first mobile device instantaneously after presenting the message to the second mobile device. In some implementations, the server may confirm receipt to the first mobile device after receiving an indication automatically generated by the second mobile device once the message has been viewed.

Figure 7:
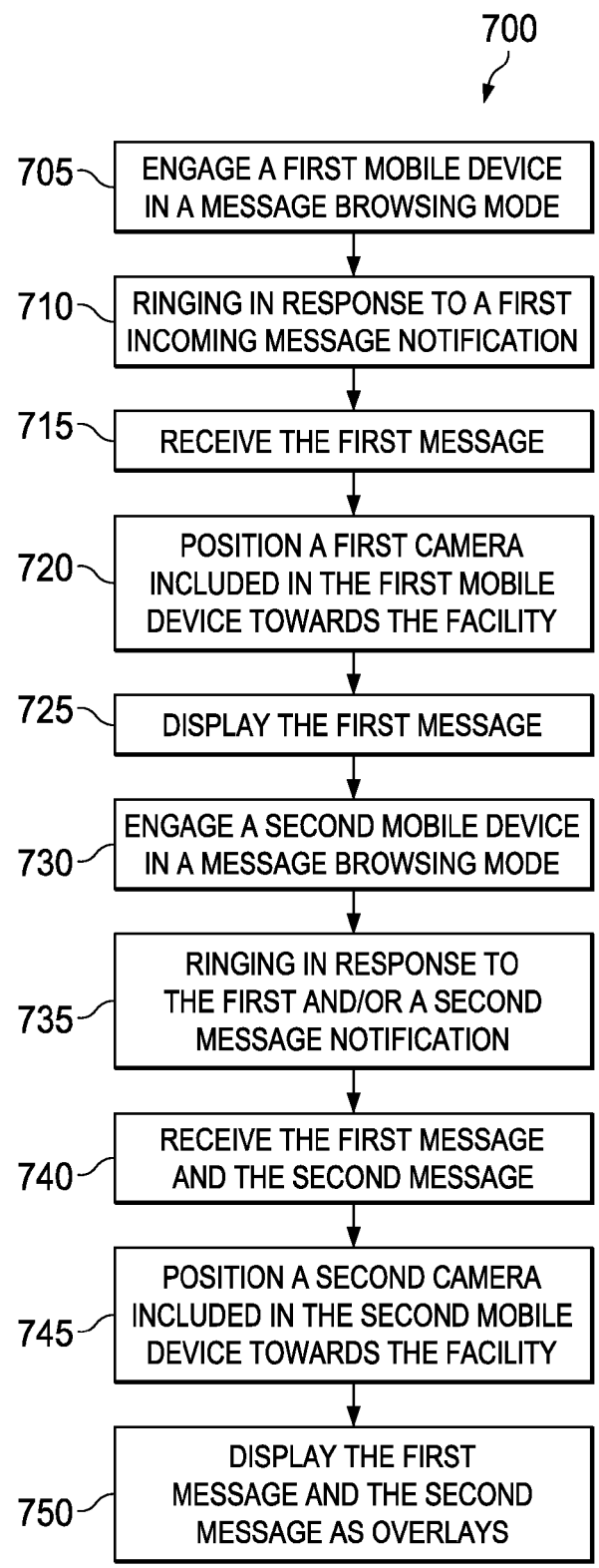
FIG. 7 is a flowchart of a process by which a user may browse wireless message associated with a facility.

FIG. 7 is a flowchart of a process 700 by which a user may browse wireless message associated with a facility. At 705, a first mobile device is engaged in a message browsing mode. In some instances, the first mobile device may engage in a message browsing mode by opening any social network application that is similar or the same to the social network application described in the illustration of FIG. 5. In some instances, the first mobile device may engage in a message browsing mode by opening an augmented reality application, such as the augmented reality application described in the illustration of FIG. 4.

At 710, the system rings the first mobile device in response to a first incoming message notification. The first incoming message notification may be sent by the wireless location service system when the second mobile device is identified to be in proximity of the facility that the message is associated with. The wireless location service system may send the first incoming message notification based on address information, time information and/or range information associated with the message. The mobile device may chime when a message is ready and proximate to the mobile device. The first mobile device may invoke a message browsing application or invoke a message browsing mode in response to receiving a message notification.

At 715, the system receives the first message. The first message may be automatically received by the first mobile device in response to determining that the wireless mobile device is proximate to the facility and engaged in a message browsing mode. The first message may be received after performing an action to the first mobile device in response to the notification. Example action performed may be an action of pressing a virtual button of the touch screen of a smartphone, or pressing a button of a keyboard.

At 720, the system positions a first camera included in the first mobile device towards the facility. By positioning the camera towards the facility, a real-time view of the facility is displayed on the first mobile device.

At 725, the system displays a first message on the first mobile device. The first message may be displayed on a virtual "Wall" or a browsing window of a social network application. The first message also may be displayed as virtual graffiti overlays on the real-time view of the facility, such as the example illustrated in FIG. 4.

At 730, the system engages a second mobile device in a message browsing mode. The operations related to engaging in the message browsing mode for the second mobile device may be substantially similar to the first mobile device at 705. At 735, the second mobile device rings in response to a second incoming message notification. The operations related to ringing the second mobile device may be substantially similar to ringing the first mobile device at 710. At 740, the process receives the first message and the second message by the second mobile device. The operations related to receiving the second message may be substantially similar to receiving the first message at 715. At 745, a second camera included in the second mobile device is positioned towards the facility. The operations related to positioning the second camera may be substantially similar to positioning the first camera at 720.

At 750, the system displays the first message and the second message as overlays on a user interface of the second mobile device. The overlays may be distinguished by their shapes, colors, types or text fonts. In some instances, the first message and the second message may also be displayed through the browsing window of a social network application.

While this specification contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems may generally be integrated together in a single product or packaged into multiple products.

In the present disclosure, "each" refers to each of multiple items or operations in a group, and may include a subset of the items or operations in the group and/or all of the items or operations in the group. In the present disclosure, the term "based on" indicates that an item or operation is based, at least in part, on one or more other items or operations and may be based exclusively, partially, primarily, secondarily, directly, or indirectly on the one or more other items or operations.

A number of implementations have been described. Nevertheless, it will be understood that various modifications may be made without departing from the spirit and scope of the disclosure. Accordingly, other implementations are within the scope of the following claims.

What is claimed is:

1. A method for delivering a message, the method comprising:
   receiving a message from a first mobile device;
   based upon a physical location of the first mobile device, identifying one or more facilities with which to associate the message;
   providing, to the first mobile device, data to represent the identified one or more facilities with which to associate the message and additional data to represent a respective distance from the physical location to each of the one or more facilities, in a format such that when the data and the additional data are displayed on the first mobile device, a user is allowed to select at least one of the identified one or more facilities with which to associated the message;
   receiving, from the first mobile device, an indication of a selection by the user of the at least one of the identified one or more facilities;
   associating the message with the selected at least one of the identified one or more facilities;
   receiving an indication when a second mobile device is:
      proximate to the selected at least one of the identified one or more facilities, and
      engaged in a message browsing mode; and
   presenting, in response to receiving the indication that the second mobile device is proximate to the selected at least one of identified the one or more facilities and engaged in the message browsing mode, the message to the second mobile device.

2. The method of claim 1, wherein presenting the message includes receiving information descriptive of movement of the first mobile device that is tracked by a sensor included in the first mobile device, and presenting the message based on the received information.

3. The method of claim 2, wherein presenting the message further includes presenting the message in a form of graffiti that has a shape and a size based on the received information descriptive of the movement of the first mobile device.

4. The method of claim 1, further comprising:
   identifying, based on the received message, addressing information;
   determining that the addressing information is related to the second mobile device; and
   presenting the message to the second mobile device.

5. The method of claim 1, further comprising:
   identifying, based on receiving the message, a range indicator that describes a three dimensional range;
   determining the three dimensional range based on the identified range indicator; and
   receiving the indication further includes receiving the indication when the second mobile device is within the three dimensional range proximate to the selected at least one of the identified one or more facilities.

6. The method of claim 1, further comprising:
   identifying, based on receiving the message, a time indicator that describes a time when the message may be presented;
   determining a time based on the identified time indicator; and
   presenting the message to the second mobile device during the time when the message may be presented.

7. The method of claim 1, further comprising transmitting the message to the first mobile device to indicate that the message has been presented to the second mobile device.

8. The method of claim 1, further comprising:
   receiving a second message from a third mobile device that at least a portion of the message includes information associated with a second physical location;
   identifying, based on the received second message, the selected at least one of the identified one or more facilities based on the second physical location;
   associating the second message with the selected at least one of the identified one or more facilities;
   receiving an indication when a fourth mobile device is:
      proximate to the selected at least one of the identified one or more facilities, and
      engaged in message browsing mode; and
   presenting, in response to receiving the indication that the fourth mobile device is proximate to the selected at least one of the identified one or more facilities and engaged in message browsing mode, the first message and the second message to the four mobile device as overlays.

9. The method of claim 1, wherein receiving an indication of a selection by the user of at least one of the identified one or more facilities further includes-receiving an indication of the selection by the user of the at least one of the identified one or more facilities based on receiving the message from the first mobile device from a social networking application, and presenting the message further includes presenting the message to be displayed through a social networking application.

10. A system for delivering a message, the system comprising:
   at least one wireless access point;
   a database; and
   a server operable to perform operations including:
      receiving a message from a first mobile device;
      based upon a physical location of the first mobile device, identifying one or more facilities with which to associate the message;
      providing, to the first mobile device, data to represent the identified one or more facilities with which to associate the message and additional data to represent a respective distance from the physical location to each of the one or more facilities, in a format such that when the data and additional data are displayed on the first mobile device, a user is allowed to select at least one of the identified one or more facilities with which to associated the message;
      receiving, from the first mobile device, an indication of a selection by a user the user of the at least one of the identified one or more facilities;

associating the message with the selected at least one of the identified one or more facilities;
receiving an indication when a second mobile device is:
proximate to the selected at least one of the identified one or more facilities, and
engaged in a message browsing mode; and
presenting, in response to receiving the indication that the second mobile device is proximate to the selected at least one of identified the one or more facilities and engaged in the message browsing mode, the message to the second mobile device.

11. The system of claim 10, wherein presenting the message includes receiving information descriptive of movement of the first mobile device that is tracked by a sensor included in the first mobile device, and presenting the message based on the received information.

12. The system of claim 11, wherein presenting the message further includes presenting the message in a form of graffiti that has a shape and a size based on the movement of the first mobile device.

13. The system of claim 10, the operations of the server further comprising:
identifying, based on the received message, addressing information;
determining that the addressing information is related to the second mobile device; and
presenting the message to the second mobile device.

14. The system of claim 10, the operations of the server further comprising:
identifying, based on receiving the message, a range indicator that describes a three dimensional range;
determining the three dimensional range based on the identified range indicator; and
receiving the indication further includes receiving the indication when the second mobile device is within the three dimensional range proximate to the selected at least one of the identified one or more facilities.

15. The system of claim 10, the operations of the server further comprising:
identifying, based on receiving the message, a time indicator that describes a time when the message may be presented;
determining a time based on the identified time indicator; and
presenting the message to the second mobile device during the time when the message may be presented.

16. The system of claim 10, the operations of the server further comprising transmitting the message to the first mobile device to indicate that the message has been presented to the second mobile device.

17. The system of claim 10, wherein the first mobile device and the second mobile device are the same.

18. The system of claim 10, wherein the message browsing mode is a mode that an application associated with augmented reality is executed.

19. The system of claim 10, the operations of the server further comprising:
receiving a second message from a third mobile device that at least a portion of the message includes information associated with a second physical location;
identifying, based on the received second message, the selected at least one of the identified one or more facilities based on the second physical location;
associating the second message with the selected at least one of the identified one or more facilities;
receiving an indication when a fourth mobile device is:
proximate to the selected at least one of the identified one or more facilities, and
engaged in message browsing mode; and
presenting, in response to receiving the indication that the fourth mobile device is proximate to the selected at least one of the identified one or more facilities and engaged in message browsing mode, the first message and the second message to theme fourth mobile device as overlays.

20. An apparatus comprising:
a processor, the processor operable to execute instructions to:
receiving a message from a first mobile device;
based upon a physical location of the first mobile device, identifying one or more facilities with which to associate the message;
providing, to the first mobile device, data to represent the identified one or more facilities with which to associate the message and additional data to represent a respective distance from the physical location to each of the one or more facilities, in a format such that when the data and the additional data are displayed on the first mobile device, a user is allowed to select at least one of the identified one or more facilities with which to associated the message;
receiving, from the first mobile device, an indication of a selection by a user the user of the at least one of the identified one or more facilities;
associating the message with the selected at least one of the identified one or more facilities;
receiving an indication when a second mobile device is:
proximate to the selected at least one of the identified one or more facilities, and
engaged in a message browsing mode; and
presenting, in response to receiving the indication that the second mobile device is proximate to the selected at least one of identified the one or more facilities and engaged in the message browsing mode, the message to the second mobile device.

* * * * *